350-96.24 SR
XR 3,430,057
CROSS REFERENCE SEARCH ROOM

Feb. 25, 1969 R. GENÄHR 3,430,057

EPISCOPIC SCANNING HEAD HAVING SMALLER OPTICAL FIBERS INTERLEAVED IN INTERSTICES FORMED BY CONTIGUOUS LARGER FIBERS

Filed June 17, 1966

INVENTOR:
Rudolf Genähr

BY

Karl G. Ross
Attorney

3430057

3,430,057

EPISCOPIC SCANNING HEAD HAVING SMALLER OPTICAL FIBERS INTERLEAVED IN INTERSTICES FORMED BY CONTIGUOUS LARGER FIBERS

Rudolf Genähr, Bad Kreuznach, Germany, assignor to Firma Jos. Schneider & Co., a corporation of Germany Filed June 17, 1966, Ser. No. 558,323
Claims priority, application Germany, June 22, 1965, Sch 37,263
U.S. Cl. 250—227 4 Claims
Int. Cl. H01j *5/16, 39/12;* G02b *5/14*

My present invention relates to an optical scanner of the episcopic type, adapted to be moved across an illuminated message-bearing surface for the purpose of conveying information about the message to one or more photosensitive receivers, e.g. a set of photocells. Such a scanner has ben described in commonly assigned application Ser. No. 536,595, filed by me jointly with Kurt Brolde on Mar. 21, 1966.

As disclosed in the prior application, a scanner of highly compact construction is obtained by the provision of two arrays of light-conducting fibers, i.e. a first array designed to convey light from a radiation source to a message-carrying surface to be scanned and a second array which channels the reflected light from that surface to a photosensitive receiving means, such as a set of photocells positioned for individual illumination by the last-mentioned fibers.

In order to facilitate scanning of the message, the ends of the two fiber arrays proximal to the message-bearing surface are physically interconnected to form a head which is manually or automatically movable across that surface in a pre-determined direction, e.g. horizontally from left to right for the line-by-line reading of a written or printed text. At least the fibers of the second array, i.e. the bundle serving to channel the reflected light to the associated photocells or equivalent transducers, may in this case have the form of a flat bank of substantially parallel filaments lying, particularly in the region proximal to the reading surface, in a plane (usually a vertical one) perpendicular to a plane that is normal to this surface and includes the direction of the scanning displacement. This relationship may also be so defined that the cross-section of the fiber bank, when projected upon the reading surface, is substantially a narrow rectangle transverse to the direction of scanning. It may be noted in this connection that the fibers of the "reading" bundle should maintain their relative positions throughout their length, in order to ensure proper reproduction of the message at the receiving station, whereas the "illuminating" fibers need not be parallel but may be randomly intertwined between the light source and the message surface.

In a preferred embodiment of the scanner disclosed in the prior application, the array of illuminating fibers is split into two bundles converging symmetrically, from opposite ends, upon the bank of reading fibers. The object of my present invention is to improve upon this arrangement to afford sharper contrast between the reflective and the nonreflective message portions, with maximum suppression of the influence of direct cross-radiation to the reading fibers from the illuminating fibers.

This object is realized, in accordance with the present invention, by an arrangement wherein the ends of the two sets of fibers proximal to the message surface include substantially the same angle with a perpendicular to said surface whereby impinging light on the first array of fibers is reflected by the nonabsorbent message portions toward the second array of fibers substantially longitudinally of the later, thus at an optimum angle of incidence upon the exposed ends of the reading fibers so that overall intensity of illumination can be reduced and the effect of stray reflections is minimized.

The angle included between the fibers and the perpendicular to the message surface may be zero, i.e. all the fibers may be parallel to one another and perpendicular to the reading surface in the vicinity of this surface. Since the lateral radiation of fiber-optical filaments is negligible, no special precautions need be taken in that case to prevent direct cross-illumination. In fact, the two sets of fibers may be intermingled in a single bundle, as by making the illuminating fibers narrower than the reading fibers and disposing the former in the longitudinal interstices unavoidably present between the latter. On the other hand, if the fibers include a finite acute angle with the perpendicular and therefore with the reading surface itself, it may be desirable to interpose a preferably reflective triangular shield between the two arrays, with the apex of the shield projecting beyond their proximate ends toward the reading surface, the angle of this apex being bisected by the aforementioned perpendicular. Such a shield will be especially advantageous if the two arrays approach each other at an angle close to 90° so that cross-illumination would otherwise become a factor.

The invention will be described in greater detail with reference to the appended drawing in which.

Figures 1, 2, 3, 4:
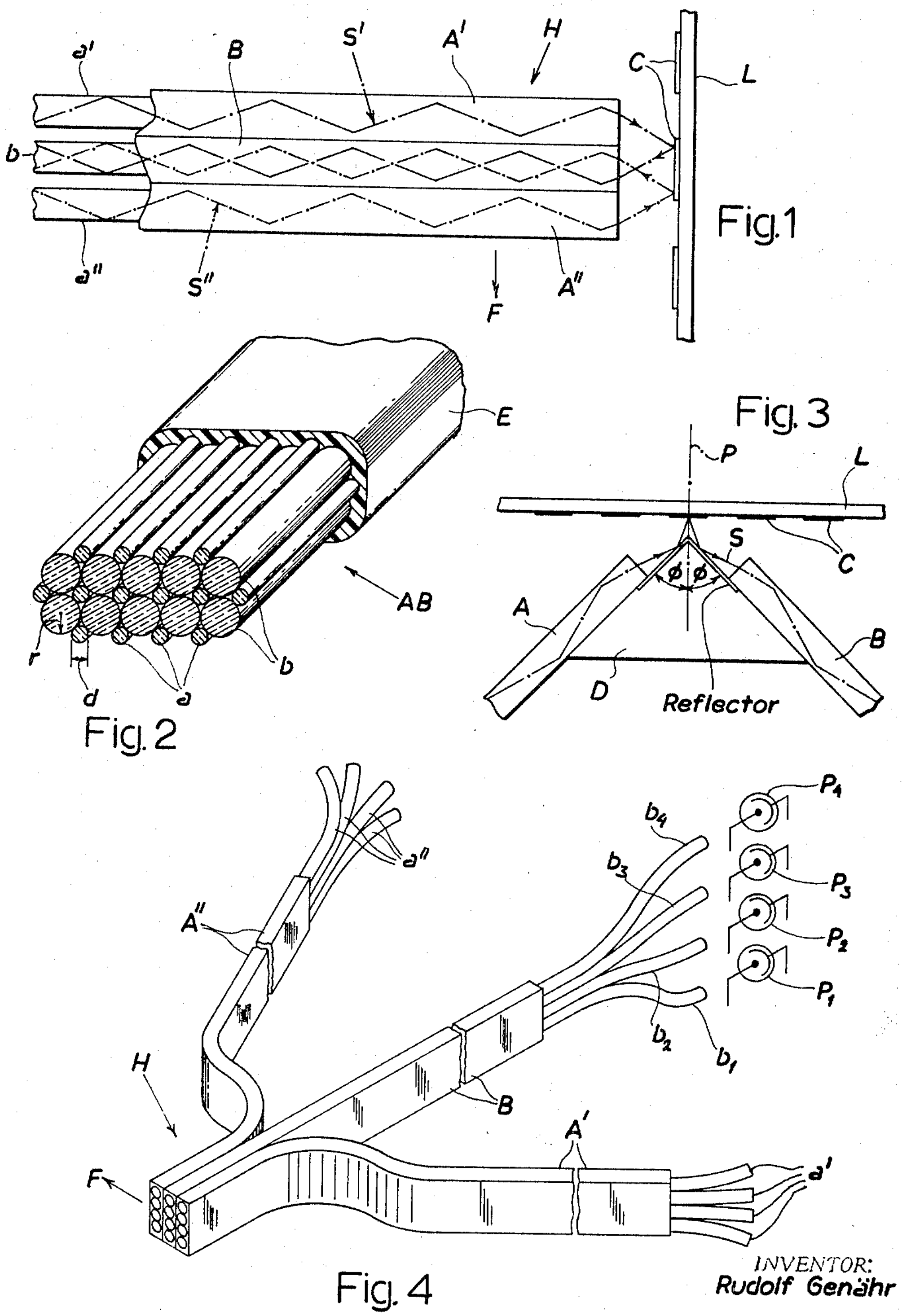
FIG. 1 is a somewhat diagrammatic top view of a reading surface and a scanning head embodying the invention.
FIG. 2 is a fragmentary perspective view of a modified scanning head.
FIG. 3 is a top view similar to FIG. 1, showing a further modification.
FIG. 4 is a partly diagrammatic perspective view of the scanning head of FIG. 1 and associated elements.

Throughout the drawing, and in conformity with the designations used in the prior application, the array of illuminating fibers is identified by the letter A whereas the bundle of reading fibers is indicated as B.

As diagrammatically illustrated in FIG. 1, a carrier L (e.g. a sheet of paper) bears on one surface thereof a message C to be episcopically scanned confronting this message are the exposed ends of two sets of light-conducting fibers *a′*, *a″*, bundled into respective cables A′, A″, see also FIG. 4, and of a bank of similar filaments *b* forming part of a cable B, each cable comprising an opaque sheath surrounding its fibers. The three cables A′, B and A″ extend parallel to one another, at least near the message carrier L, to form a scanning head H which may be moved, relative to carrier L, across the message C in the direction of arrow F. This direction, as best seen from FIG. 4, is perpendicular to the major transverse dimension of each cable. The other ends of fibers *a′* and *a″*, remote from message carrier L, confront one or more light source (not shown) so that light rays S′, S″ are conducted thereby, with internal reflection, toward the message C where they are selectively reflected toward the proximal ends of fibers *b* sandwiched therebetween.

Although the dimensions of the fibers have been enlarged and distorted for clarity, it will be apparent from FIG. 1 that at least a substantial part of all the light rays transmitted by fibers *a′*, *a″* will impinge upon the message-bearing surface of carrier L at such an angle (in reality close to 90°) that upon reflection at that surface they will strike the confronting ends of fibers *b*.

The fibers *b* of cable B, individually designated $b_1$, $b_2$, $b_3$ and $b_4$ (although a much larger number of such vertically superposed fibers may be used in practice), are spaced apart at their remote ends but maintain their original order in their confrontation of respective photocells $p_1$, $p_2$, $p_3$ and $p_4$. The outputs of these photocells may be used, in a manner known per se, to energize respective recording devices, lamps or other indicators reproducing discrete elements of the message C as they appear instantaneously along the line of scan facing the proximal ends of fibers *b*, as shown in FIG. 4, the cables A', B and A'' need not maintain their parallelism beyond the region of scanning head H.

In FIG. 2 I have shown a bank of reading fibers *b*, of relatively large diameter $2r$, arrayed in two adjoining tiers which between them form longitudinal interstices receiving illuminating fibers *a* of relatively small diameter *d*, the optimum relationship between these diameters being $d=0.83r$ in which event the space within the rectangular cable sheath E is fully utilized. The single cable AB of FIG. 2, whose illustrated extremity constitutes the scanning head, may be used in the same manner as the combination of cables A', A'', B in FIG. 1.

In FIG. 3 I have shown an illuminative cable A and a reading cable B, each including the same acute angle $\phi$ (here of approximately 45°) with the perpendicular P to the reading surface of carrier L. A light ray S from bundle *a*, which otherwise would directly impinge on bundle *b*, is intercepted by a triangular shield D whose apex angle $2\phi$ is bisected by the line P. One of the sides of shield D, being reflective at least in the region of the projecting apex, directs this light ray toward the message C whence it may or may not reach the cable B via the other reflective side, depending upon the degree of reflectivity of the illuminated message portion. Other light ray, not shown, are directly reflected by the carrier surface without striking the shield D.

I claim:

1. In combination with a surface carrying a message to be scanned, an optical scanner comprising:
   - a first array of light-conducting fibers of circular cross-section having closely spaced exposed first ends and second ends remote from said first ends;
   - a second array of light-conducting fibers of circular cross-section having exposed first ends contiguously disposed in a flat bank of parallel filaments divided into a plurality of tiers, the fibers of said first array being smaller than those of said second array and having their first ends individually disposed in respective longitudinal interstices between the contiguous first ends of said second array;
   - light-source means positioned to irradiate said second ends of said first array of fibers;
   - and a plurality of photosensitive receiving means disposed adjacent said second ends of said second array of fibers for illumination thereby, said first ends of said first array and said first ends of said second array interleaved therewith being positioned next to said surface for joint displacement relative thereto.

2. The combination defined in claim 1 wherein the diameter of the fibers of said first array is substantially equal to 0.83 times the radius of the fibers of said second array.

3. In combination with a surface carrying a message to be scanned, an optical scanner comprising:
   - a first array of light-conducting fibers having closely spaced exposed first ends and second ends remote from said first ends;
   - a second array of light-conducting fibers having exposed first ends closely juxtaposed with said first ends of said first array of fibers and second ends remote from said first ends thereof, said first ends of said arrays including with said surface an acute angle;
   - light-source means positioned to irradiate said second ends of said first array of fibers;
   - a plurality of photosensitive receiving means disposed adjacent said second ends of said second array of fibers for illumination thereby, said first ends of said first array and said first ends of said second array being physically interconnected next to said surface for joint displacement relative thereto and including substantially the same angle with a perpendicular to said surface whereby light directed via said first array onto said surface is reflected thereby toward said second array substantially longitudinally of the fibers thereof;
   - and a generally triangular shield between said arrays with an apex projecting beyond said first ends toward said surface, the angle of said apex being substantially double said acute angle, at least the sides of the projecting apex of said shield being light-reflective.

4. The combination defined in claim 3 wherein said acute angle is substantially 45°.

References Cited

UNITED STATES PATENTS

| | | | |
|---|---|---|---|
| 3,125,013 | 3/1964 | Herrick et al. | 350—96 X |
| 3,192,843 | 7/1965 | Kapany et al. | |
| 3,255,357 | 6/1966 | Kapany et al. | 250—227 |
| 3,294,903 | 12/1966 | Goldmark et al. | |
| 3,305,689 | 2/1967 | Leavy et al. | 250—227 |
| 3,327,584 | 6/1967 | Kissinger | 350—96 X |
| 3,350,183 | 10/1967 | Siegmund et al. | 350—96 X |
| 3,278,283 | 10/1966 | Bazinet | 350—96 X |

ROBERT SEGAL, *Primary Examiner.*

U.S. Cl. X.R.

350—96